(12) United States Patent
Li et al.

(10) Patent No.: US 8,704,865 B2
(45) Date of Patent: Apr. 22, 2014

(54) SYSTEM AND METHOD FOR RE-ACCESS OF WIRELESS VIDEO CONFERENCE TERMINAL

(75) Inventors: Jichao Li, Shenzhen (CN); Sen Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 111 days.

(21) Appl. No.: 13/579,664

(22) PCT Filed: Sep. 14, 2010

(86) PCT No.: PCT/CN2010/076899
§ 371 (c)(1),
(2), (4) Date: Aug. 17, 2012

(87) PCT Pub. No.: WO2011/150609
PCT Pub. Date: Dec. 8, 2011

(65) Prior Publication Data
US 2012/0314016 A1    Dec. 13, 2012

(30) Foreign Application Priority Data
Jun. 4, 2010  (CN) .......................... 2010 1 0198325

(51) Int. Cl.
*H04N 7/15* (2006.01)
(52) U.S. Cl.
CPC ...................................... *H04N 7/15* (2013.01)
USPC .................. 348/14.02; 348/14.08; 348/14.09; 348/14.12
(58) Field of Classification Search
CPC ........... H04N 7/14; H04N 7/147; H04N 7/15; H04N 7/152; H04N 7/155; H04L 63/083; H04W 12/06; H04W 28/04; H04W 76/028
USPC .................... 358/14.01–14.16; 370/260–261; 709/204; 379/93.02, 93.03
See application file for complete search history.

(56) References Cited

U.S. PATENT DOCUMENTS

| | | | |
|---|---|---|---|
| 6,320,606 B1 * | 11/2001 | Wada | 348/14.01 |
| 2004/0203677 A1 * | 10/2004 | Brown et al. | 455/416 |
| 2007/0200924 A1 | 8/2007 | Tran et al. | |
| 2008/0195703 A1 * | 8/2008 | Salesky et al. | 709/204 |

FOREIGN PATENT DOCUMENTS

| | | |
|---|---|---|
| CN | 101557498 A | 10/2009 |
| CN | 101605366 A | 12/2009 |
| CN | 101668224 A | 3/2010 |
| CN | 101860716 A | 10/2010 |

OTHER PUBLICATIONS

International Search Report in international application number: PCT/CN2010/076899, mailed on Dec. 30, 2010.
English Translation of the Written Opinion of the International Search Authority in international application number: PCT/CN2010/076899, mailed on Dec. 30, 2010.

* cited by examiner

*Primary Examiner* — Melur Ramakrishnaiah
(74) *Attorney, Agent, or Firm* — Oppedahl Patent Law Firm LLC

(57) ABSTRACT

The invention discloses a system for re-access of a wireless video conference terminal, including: a protection module configured to record relevant information of a conference in the event of terminal disconnection, log in to the video conference network according to the relevant information of the conference upon recovery of the network signal, and send a terminal reentering module the information for reentering the conference, wherein the relevant information of the conference contains a username and a password; and the terminal reentering module configured to determine that the terminal passes authentication according to the username as well as the information for reentering the conference and admit the terminal into the conference. The invention further discloses a method for re-access of a wireless video conference terminal. Adoption of the system and the method improves the user experience and facilitates the promotion of the wireless video conference.

10 Claims, 2 Drawing Sheets

SYSTEM AND METHOD FOR RE-ACCESS OF WIRELESS VIDEO CONFERENCE TERMINAL

TECHNICAL FIELD

The present disclosure relates to the field of video conference, in particular to a system and a method for re-access of a wireless video conference terminal.

BACKGROUND

A video conference system consists of a conference control system and video conference terminals. In an immobile video conference system, the conference control system and the video conference terminals are networked via an Internet Protocol (IP); Each video conference terminal has a fixed IP address and is stably linked to a fixed local area network. A wireless video conference system is a brand-new form of video conference based on a wireless communication system and the immobile video conference system, and is an embodiment of the immobile video conference system in the wireless communication system, i.e., the wireless video conference system can effect all functions of the immobile video conference system and the video conference terminals can move freely.

A wireless video conference terminal, such as a mobile terminal, is networked with the conference control system via wireless communication and performs video conference connection and data exchange with the other wireless or wired terminals via the conference control system. However, the signal of the mobile terminal is unstable, and the possibility of disconnection seriously hinders the progress of the video conference and affects user experience.

SUMMARY

Therefore, the main purpose of the present disclosure is to provide a system and a method for re-access of a wireless video conference terminal, so as to improve the user experience and facilitate the promotion of the wireless video conference business.

In order to achieve this purpose, the technical solution of the present disclosure is implemented as follows:

The invention discloses a system for re-access of a wireless video conference terminal, including:

a protection module configured to record relevant information of a conference in the event of terminal disconnection, log in to a video conference network according to the relevant information of the conference upon recovery of a network signal, and send a terminal reentering module the information for reentering the conference, wherein the relevant information of the conference contains a username and a password; and the terminal reentering module configured to determine that a terminal passes authentication according to the username as well as the information for reentering the conference and admit the terminal into the conference.

In the solution, the system may further include a main terminal module configured to send terminal disconnection information containing the relevant information of the conference to the protection module upon terminal disconnection, receive from the protection module a message for querying current network information, and send the current network signal to the protection module; accordingly, the protection module may be specifically configured to receive the terminal disconnection information, record the relevant information of the conference, start a built-in timer, send the message for querying the current network signal to the main terminal module, and reset the timer when there is no network signal or log in to the video conference network when there is a network signal.

In the solution, the system may further include a main processing module configured to receive a message for logging in to the video conference network and require the main terminal module to input the username and the password; accordingly, the protection module may be further configured to send the message for logging in to the video conference network, the username, and the password to the main terminal module; and the main terminal module may be further configured to receive the message for logging in to the video conference network, the username, and the password from the protection module, send the message for logging in to the video conference network to the main processing module, and input the username and the password into the main processing module.

In the solution, the protection module may be specifically configured to send the information for reentering the conference to the main processing module via the main terminal module, wherein the information for reentering the conference includes a conference Identity (ID) and terminal status; the main processing module may be specifically configured to send the information for reentering the conference and the username to the terminal reentering module; and the terminal reentering module may be specifically configured to compare the conference ID with local stored IDs of conferences in progress, when the conference ID does not match with any one of the local stored IDs, send, via the main processing module and the main terminal module, the protection module a terminal reentering instruction indicating that the conference has ended, when the conference ID matches with one of the local stored IDs, compare the username with the local preset usernames empowered to enter the conference, when the username does not match with any of the local preset usernames, send, via the main processing module and the main terminal module, the protection module a terminal reentering instruction indicating that the terminal is not empowered, and when the username matches with one of the local preset usernames, admit the terminal into the conference and send, via the main processing module and the main terminal module, the protection module the terminal reentering instruction indicating that the terminal enters the conference.

In the solution, the protection module may be specifically configured to receive the terminal reentering instruction, stop the timer, and send the terminal reentering instruction to the main terminal module; or to reset the timer, log in to the video conference network, and send the information for reentering the conference when the terminal reentering instruction is not received within a preset time period. Accordingly, the main terminal module may be further configured to send the received terminal reentering instruction to a User Interface (UI) module which then displays the received terminal reentering instruction to a user.

The invention further provides a method for re-access of a wireless video conference terminal, wherein the method includes:

recording relevant information of a conference in the event of terminal disconnection, logging in to a video conference network according to the relevant information of the conference upon recovery of a network signal, and sending the information for reentering the conference to a conference control system, and the conference control system determining, according to a username and the information for reentering the conference, that a terminal passes authentication and admitting the terminal into the conference.

In the solution, the terminal may include a main terminal module and a protection module; and before the recording of the relevant information of the conference, the method may further include that the main terminal module activates the protection module and sends the terminal disconnection information to the protection module, wherein the terminal disconnection information may contain the relevant information of the conference, and the recording of the relevant information of the conference may specifically include that the protection module records the relevant information of the conference.

In the solution, the logging in to the video conference network according to the relevant information of the conference may include that the terminal sends the conference control system a message for logging in to the video conference network, receives from the conference control system a request for inputting the username and a password, and inputs the username and the password into the conference control system.

In the solution, determining, by the conference control system, according to the username and the information for reentering the conference, that the terminal passes authentication and admitting the terminal into the conference may include that the terminal sends the information for reentering the conference, including a conference ID, to the conference control system, and the conference control system compares the conference ID with local stored IDs of all conferences in progress, when the conference ID does not match with any one of the local stored IDs, sends the terminal a terminal reentering instruction indicating that the conference has ended, otherwise compares the username with local preset usernames empowered to enter the conference, when the username does not match with any of the local preset usernames, sends the terminal the terminal reentering instruction indicating that the terminal is not empowered, otherwise admits the terminal into the conference, and sends the terminal the terminal reentering instruction indicating that the terminal enters the conference.

In the solution, the method may further include: after the main terminal module activates the protection module and sends the terminal disconnection information to the protection module, the protection module starts a built-in timer and sends a message for querying the network signal to the main terminal module; the protection module resets the timer and sends once more the message for querying the network signal to the main terminal module when there is no network signal, otherwise logs in to the video conference network and sends the information for reentering the conference; when the terminal reentering instruction is not received within a preset time period, the protection module resets the timer, logs in to the video conference network again, and sends the information for reentering the conference, otherwise stops the timer.

Therefore, with the system and the method of the invention, after terminal disconnection, a wireless video conference terminal in a video conference can automatically log in to the video conference network and reenter the conference upon recovery of the network signal, which improves the user experience and facilitates the promotion of the wireless video conference business.

DETAILED DESCRIPTION

The basic idea of the invention is to record the relevant information of the conference after terminal disconnection, log in to the video conference network according to the relevant information of the conference upon recovery of the network signal, and send the information for reentering the conference to the conference control system which then determines that the terminal passes authentication according to the username and the information for reentering the conference and admits the terminal into the conference.

Wherein the terminal is a wireless video conference terminal; the relevant information of the conference includes the conference ID, the current terminal status (including whether the terminal is in the video conference mode, whether the user is in speech mode or listening mode, whether speech is disabled, and the like) and the username and the password for the terminal to log in to the video conference network; and the information for reentering the conference includes the conference ID and the terminal status.

Figure 1:
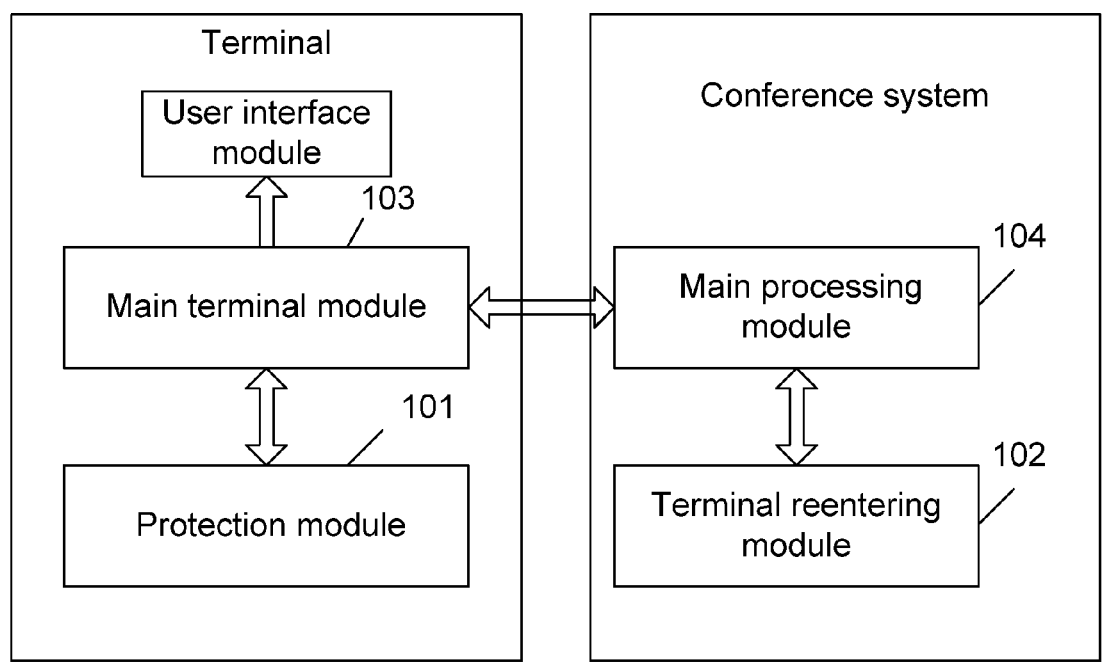
FIG. 1 shows the buildup of a system effecting re-access of a wireless video conference terminal according to the invention.

The invention is described in detail below with reference to drawings and specific embodiments. As shown in FIG. 1, the system for re-access of a wireless video conference according to the invention specifically includes:

a protection module 101 configured to record the relevant information of the conference after terminal disconnection, determine recovery of the network signal, log in to the video conference network according to the relevant information of the conference, and send a terminal reentering module 102 the information for reentering the conference due to terminal disconnection; and the terminal reentering module 102, which is located at the conference control system, configured to determine that a terminal passes authentication according to the username and the received information for reentering the conference and admit the terminal into the conference.

The system further includes a main terminal module 103 and a main processing module 104, wherein the main terminal module 103 is configured to activate the protection module 101 after determination of the terminal disconnection, wherein the activation is to send the protection module 101 the terminal disconnection information including the relevant information of the conference; the determination of the terminal disconnection includes acquiring the current network status of the terminal from a communication module wherein if there is currently no network signal, the terminal is disconnected; and the main terminal module 103 can acquire the relevant information of the conference in real time;

the protection module 101 is specifically configured to receive the terminal disconnection information from the main terminal module 103, record the relevant information of the conference, start a built-in timer, send a message for querying the current network signal to the main terminal module 103 at a preset time period, if there is no network signal, reset the timer to restart timing, wherein the preset time period may be set by a manufacturer to be, for example, 5 s, and if there is a network signal, send the message for logging in to the video conference network, the username, and the password to the main terminal module 103;

the main terminal module 103 is further configured to receive the message for querying the current network signal from the protection module 101, send the current network signal for the terminal to the protection module 101, receive the message for logging in to the video conference network, the username, and the password from the protection module 101, send the message for logging in to the video conference network to the main processing module 104, receive the request for inputting the username and the password from the main processing module 104, and input the username and the password; and the main processing module 104 is configured to receive the message for logging in to the video conference network from the main terminal module 103, require the main terminal module 103 to input the username and the password, receive the username and the password, and allow the terminal to log in to the video conference network.

The protection module 101 is configured to send the information for reentering the conference to the main processing module 104 via the main terminal module 103 after the main processing module 104 allows the terminal to log in to the video conference network;

the main processing module 104 is configured to receive the information for reentering the conference, acquire the terminal status for subsequent processing, and send the username and the information for reentering the conference to the terminal reentering module 102; and the terminal reentering module 102 is specifically configured to judge the conference that the terminal is about to enter exists or not, including comparing the conference ID in the information for reentering the conference with all the IDs of the conferences in progress stored in the module. when the conference ID does not match with any one of the local stored IDs, then the conference does not exist, and the terminal reentering module 102 sends, via the main processing module 104 and the main terminal module 103, the protection module 101 the terminal reentering instruction indicating the information that the conference has ended; when the conference ID matches with one of the local stored IDs, then the conference is still in progress, and the terminal reentering module 102 continues to judge whether the terminal is empowered to enter the conference, including comparing the username sent by the main processing module 104 with the preset usernames empowered to enter the conference. When the username does not match with any of the local preset usernames, the terminal is not empowered to enter the conference, and the terminal reentering module 102 sends, via the main processing module 104 and the main terminal module 103, the protection module 101 the terminal reentering instruction indicating the message that the terminal is not empowered to enter the conference. If the terminal is empowered to enter the conference, the terminal reentering module 102 admits the terminal into the video conference network, i.e., the terminal may attend the conference and the user of the terminal is allowed to speak or perform other operations; and the terminal reentering module 102 sends, via the main processing module 104 and the main terminal module 103, the protection module 101 the terminal reentering instruction indicating the message that the terminal enters the conference, and notify the other conference participants of the entering of the terminal.

The protection module 101 is specifically configured to receive the terminal reentering instruction, stop the timer, send the terminal reentering instruction to the main terminal module 103; if the terminal reentering instruction is not received within the preset time period, reset the timer, send the message, the username and the password for logging in to the video conference network to the main terminal module 103, and send via the main terminal module 103 the information for reentering the conference terminal disconnection.

Accordingly, the main terminal module 103 is configured to receive the terminal reentering instruction and send it to a UI module; and the UI module is configured to display the corresponding terminal reentering is instruction to the user.

Figure 2:
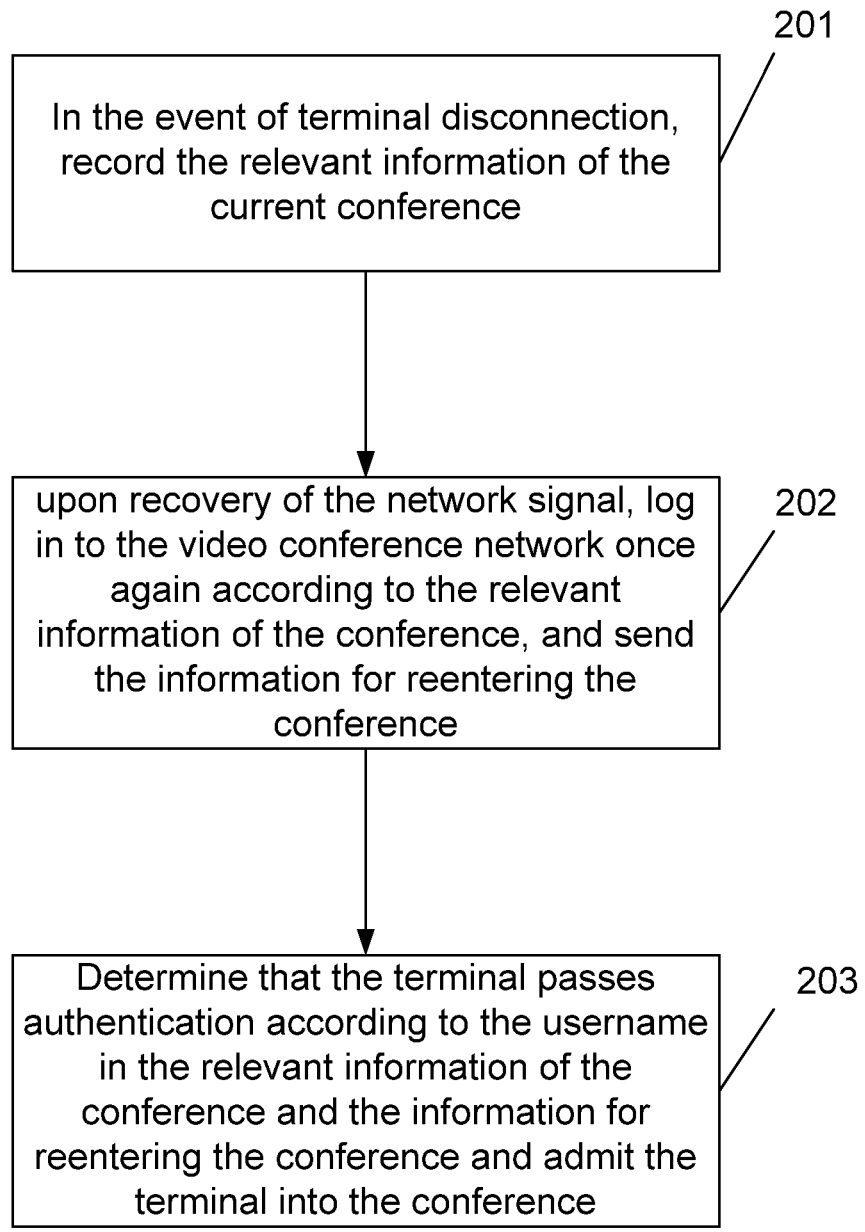
FIG. 2 is the flowchart of a method effecting re-access of a wireless video conference terminal according to the invention.

The invention further provides a method for re-access of a wireless video conference terminal, as shown in FIG. 2, with the following specific steps:

Step 201: In the event of terminal disconnection, the relevant information of the current conference is recorded, wherein in the event of terminal disconnection, the main terminal module of the terminal activates the protection module, wherein the activation includes to send the protection module the terminal disconnection information containing the relevant information of the current conference which includes the current conference ID, the current terminal status, the username, the password, and the like; the protection module records the relevant information of the current conference and sends the main terminal module the message that the terminal is disconnected due to a network issue, which message is sent by the main terminal module to the UI module which displays the message to the user.

Step 202: Upon recovery of the network signal, log in to the video conference network once again according to the relevant information of the conference, and send the information for reentering the conference, wherein the protection module receives the terminal disconnection information from the main terminal module, starts a built-in timer, and sends the main terminal module the information for acquiring the current network signal, i.e., the current network status, wherein the preset time period of the timer can be set automatically to, for example, 5 seconds; The main terminal module acquires the current network status of the terminal from a communication module and sends the current network status to the protection module; If there is no network signal, and the preset time period of the timer expires, the protection module resets the timer to restart timing and sends once again the information for acquiring the current network status to the main terminal module; and if there is a network signal, sends the message for logging in to the video conference network, the username, and the password to the main terminal module which sends said message to the main processing module which asks for the username and the password; The main terminal module sends the username and the password to the main processing module, the terminal logs in to the video conference network, and the protection module sends the main terminal module the information for reentering the conference due to terminal disconnection, wherein the information for reentering the conference includes the conference ID and the terminal status.

Step 203: Determine that the terminal passes authentication according to the information for reentering the conference and the username in the relevant information of the conference and admit the terminal into the conference.

The main terminal module sends the information for reentering the conference to the main processing module, which acquires the terminal status for subsequent processing and synchronously sends the information for reentering the conference and the username to the terminal reentering module which determines that the terminal passes authentication. The authentication specifically include comparing the conference ID in the information for reentering the conference with all the IDs of the conferences in progress stored in the terminal reentering module itself, when the conference ID does not match with any one of the local stored IDs, which means that the conference the terminal is about to enter does not exist, sending the terminal reentering instruction to the main processing module, which sends it to the protection module via the main terminal module, wherein the terminal reentering instruction includes the information that the conference has ended; when the conference ID matches with one of the local stored IDs, which means the conference does exist, comparing next the username of the terminal with the usernames preset in the terminal reentering module and empowered to enter the conference, when the username does not match with any of the local preset usernames, which indicates that the terminal is not empowered to enter the conference, sending the terminal reentering instruction to the main processing module which sends it to the protection module via the main terminal module, wherein the terminal reentering instruction includes the message that the terminal is not empowered to enter the conference; when the username matches with one of the local preset usernames, admitting the terminal into the conference, allowing the user to speak or perform other operations, sending the terminal reentering instruction to the main processing module which sends it to the protection module via the main terminal module, and notifying the other conference participants of the entering of a terminal, wherein the terminal reentering instruction includes the information that the terminal enters the conference.

The protection module receives the terminal reentering instruction, stops the timer, and sends the terminal reentering instruction to the main terminal module which sends the terminal reentering instruction to the UI module which displays to the user the corresponding terminal reentering instruction which includes that the conference does not exist, the terminal is not empowered to enter the conference, or the terminal enters the conference. If the protection module does not receive the terminal reentering instruction within the preset time period of the timer, which indicates that the system side does not receive the message from the terminal possibly due to network or other reasons, the protection module resets the timer and sends the main terminal module the message for logging in to the video conference network and the information for reentering the conference.

What described above are only the preferred embodiments of the invention, and are not meant to limit the scope of protection of the invention. Any modifications, equivalent replacements, improvements, and the like within the spirit and principles of the invention shall fall within the scope of protection of the invention.

The invention claimed is:

1. A system for re-access of a wireless video conference terminal, comprising:
a protection module configured to record relevant information of a conference in the event of terminal disconnection, log in to a video conference network according to the relevant information of the conference upon recovery of a network signal, and send a terminal reentering module the information for reentering the conference, wherein the relevant information of the conference contains a username and a password; and
the terminal reentering module configured to determine that a terminal passes authentication according to the username as well as the information for reentering the conference and admit the terminal into the conference.

2. The system according to claim 1, further comprising:
a main terminal module configured to send terminal disconnection information containing the relevant information of the conference to the protection module upon terminal disconnection, receive from the protection module a message for querying a is current network signal and send the current network signal to the protection module; and
accordingly, the protection module is specifically configured to: receive the terminal disconnection information, record the relevant information of the conference, start a built-in timer, send the message for querying the current network signal to the main terminal module, and reset the timer when there is no network signal or log in to the video conference network when there is a network signal.

3. The system according to claim 2, further comprising:
a main processing module configured to receive a message for logging in to the video conference network and require the main terminal module to input the username and the password;
accordingly, the protection module is further configured to send the message for logging in to the video conference network, the username, and the password to the main terminal module; and
the main terminal module is further configured to receive the message for logging in to the video conference network, the username, and the password from the protection module, send the message for logging in to the video conference network to the main processing module, and input the username and the password into the main processing module.

4. The system according to claim 3, wherein
the protection module is specifically configured to send the information for reentering the conference to the main processing module via the main terminal module, wherein the information for reentering the conference comprises a conference IDentity (ID), and terminal status;
the main processing module is specifically configured to send the information for reentering the conference and the username to the terminal reentering module; and
the terminal reentering module is specifically configured to compare the conference ID with local stored IDs of conferences in progress, when the conference ID does not match with any one of the local stored IDs, send, via the main processing module and the main terminal module, the protection module a terminal reentering instruction indicating that the conference has ended, when the conference ID matches with one of is the local stored IDs, compare the username with local preset usernames empowered to enter the conference, when the username does not match with any of the local preset usernames, send, via the main processing module and the main terminal module, the protection module a terminal reentering instruction indicating that the terminal is not empowered, and when the username matches with one of the local preset usernames, admit the terminal into the conference and send, via the main processing module and the main terminal module, the protection module the terminal reentering instruction indicating that the terminal enters the conference.

5. The system according to claim 4, wherein
the protection module is specifically configured to receive the terminal reentering instruction, stop the timer, and send the terminal reentering instruction to the main terminal module; or to reset the timer, log in to the video conference network and send the information for reentering the conference when the terminal reentering instruction is not received within a preset time period; and accordingly, the main terminal module is further configured to send the received terminal reentering instruction to a User Interface (UI) module which then displays the received terminal reentering instruction to a user.

6. A method for re-access of a wireless video conference terminal, comprising:
   recording relevant information of a conference in the event of terminal disconnection, logging in to a video conference network according to the relevant information of the conference upon recovery of a network signal, and sending the information for reentering the conference to a conference control system, and
   determining, by the conference control system, according to a username and the information for reentering the conference, that a terminal passes authentication and admitting the terminal into the conference.

7. The method according to claim 6, wherein the terminal comprises a main terminal module and a protection module; the method further comprising:
   before the recording of the relevant information of the conference,
   activating, by the main terminal module, the protection module and sending terminal disconnection information to the protection module, wherein the terminal disconnection information contains the relevant information of the conference; and
   recording the relevant information of the conference specifically comprising: recording, by the protection module, the relevant information of the conference.

8. The method according to claim 7, wherein logging in to the video conference network according to the relevant information of the conference comprises:
   sending, by the terminal, the conference control system a message for logging in to the video conference network, receiving from the conference control system a request for inputting the username and a password, and inputting the username and the password into the conference control system.

9. The method according to claim 8, wherein determining, by the conference control system, according to the username and the information for reentering the conference, that the terminal passes authentication and admitting the terminal into the conference comprises:
   sending, by the terminal, the information for reentering the conference, comprising a conference ID, to the conference control system, and
   comparing, by the conference control system, the conference ID with local stored IDs of all conferences in progress, when the conference ID does not match with any one of the local stored IDs, sending the terminal a terminal reentering instruction indicating that the conference has ended, otherwise comparing the username with local preset usernames empowered to enter the conference, when the username does not match with any of the local preset usernames, sending the terminal the terminal reentering instruction indicating that the terminal is not empowered, otherwise admitting the terminal into the conference, and sending the terminal the terminal reentering instruction indicating that the terminal enters the conference.

10. The method according to claim 9, further comprising: after the main terminal module activates the protection module and sends the terminal disconnection information to the protection module,
   starting, by the protection module, a built-in timer and sending a message for querying the network signal to the main terminal module;
   resetting, by the protection module, the timer and sending once more the message for querying the network signal to the main terminal module when there is no network signal; otherwise logging in to the video conference network and sending the information for reentering the conference;
   when the terminal reentering instruction is not received within a preset time period, resetting, by the protection module, the timer, logging in to the video conference network again, and sending the information for reentering the conference; otherwise stopping the timer.

* * * * *